Jan. 15, 1963
D. E. CLAPP ETAL
3,073,939
SYSTEM EMPLOYING MANUALLY DEACTIVATED HEATING ELEMENT
Filed April 30, 1959
2 Sheets-Sheet 1
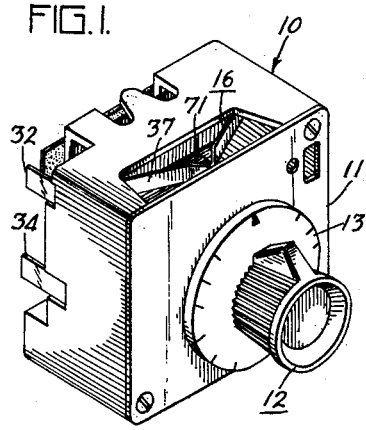
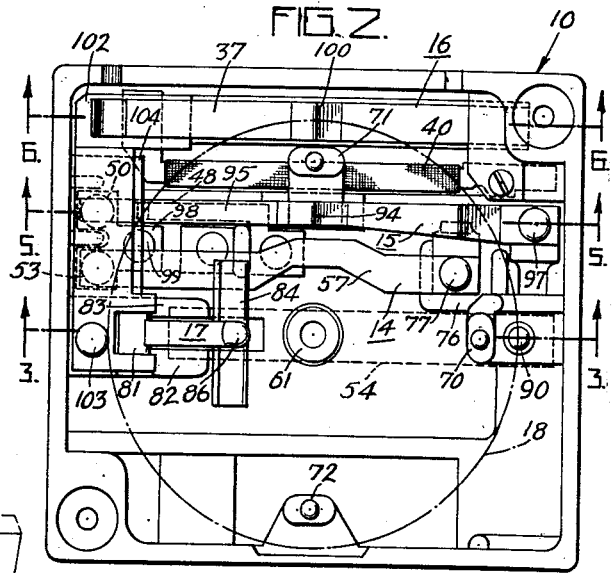
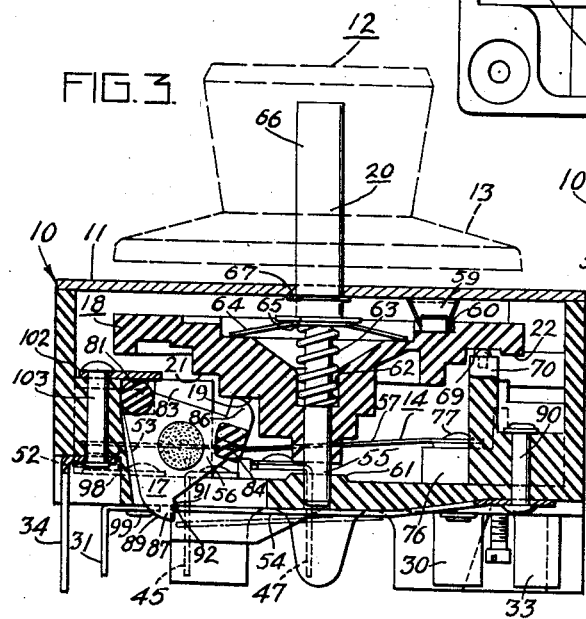
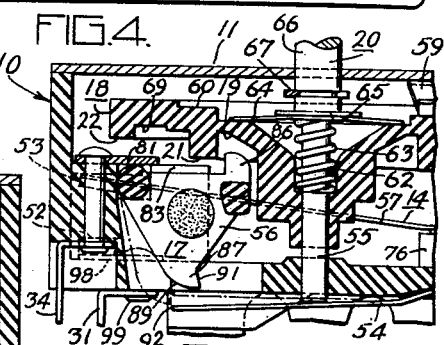
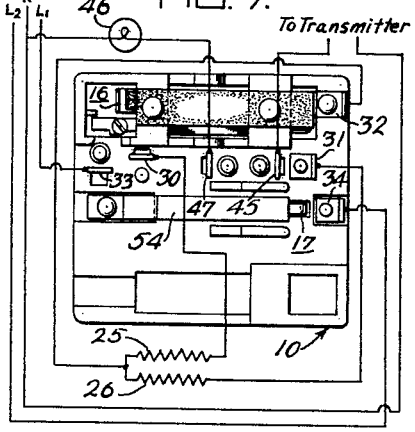
INVENTORS:
DANIEL E. CLAPP
JOHN L. EATON, JR.
BY Howson & Howson
ATTYS.

Jan. 15, 1963 D. E. CLAPP ETAL 3,073,939
SYSTEM EMPLOYING MANUALLY DEACTIVATED HEATING ELEMENT
Filed April 30, 1959
2 Sheets-Sheet 2
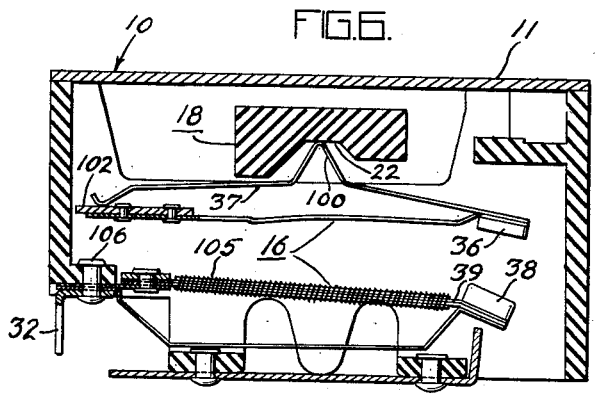
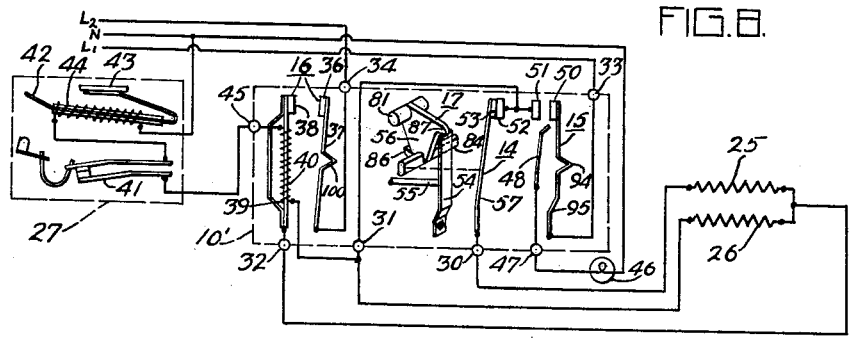
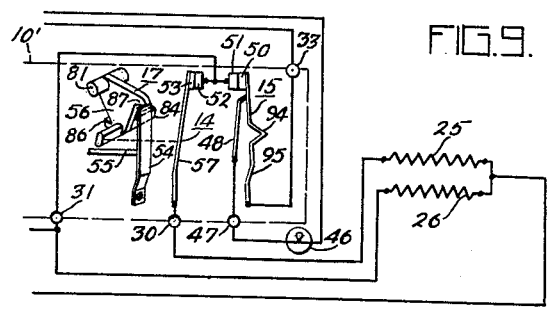
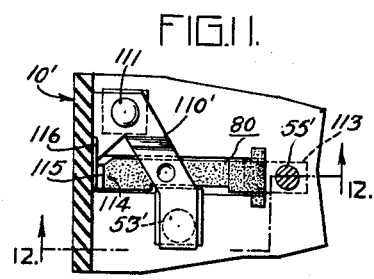
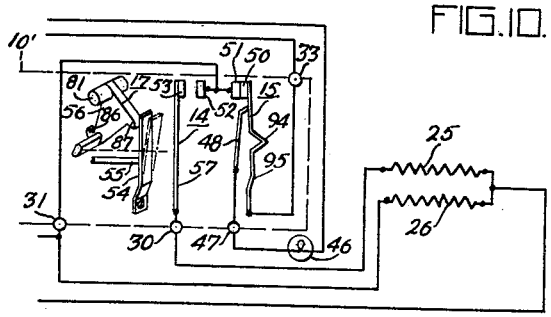
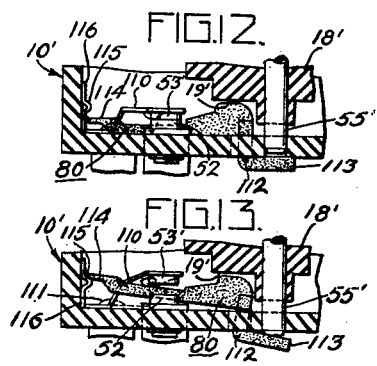
INVENTORS:
DANIEL E. CLAPP
JOHN L. EATON JR.
BY Howson & Howson
ATTYS

United States Patent Office 3,073,939
Patented Jan. 15, 1963

3,073,939
SYSTEM EMPLOYING MANUALLY DEACTI-
VATED HEATING ELEMENT
Daniel E. Clapp, Somerton, Philadelphia, and John L.
Eaton, Jr., Levittown, Pa., assignors to The Proctor-
Silex Corporation, a corporation of Pennsylvania
Filed Apr. 30, 1959, Ser. No. 810,082
18 Claims. (Cl. 219—20)

This invention relates to a heating system employing a pair of electrical heating elements which are connected in parallel, and one of which may be disconnected from the circuit in the event that reduced energization is desired. It also relates to particular arrangements of switch controls useful in such a system. The invention will find particular use in surface heating units for electric ranges.

Many electric ranges provide two coils or heating elements for each surface unit. Such units usually provide separate control settings for single and two coil energization. Typically, however, the single coil is used for low temperatures and both coils for higher temperatures. Control of temperature is achieved through a control switch or wattage controller which cycles open and closed, the higher the temperature the greater the ratio of "on" to "off" time for a given heater.

In designing heating elements and controls, particularly the surface units of household electric ranges, it has been customary to provide sufficient capacity to adequately and rapidly heat the heaviest conceivable thermal loads. Pan controls are frequently relied upon to bring the temperature of the load into correspondence with the setting of the controls. With many systems, however, it is possible for very light loads to be overheated and burned before the feedback of control information from the pan control has been effective, and regulation of temperature is often only approximate for most loads.

The present invention is intended to give more flexibility to a two coil system by permitting the use of one or both heater elements over the entire range of temperature settings. This has at least two important advantages. One is the ability to provide less heat per unit of "on" time to achieve a given temperature in a light load, as for example, a light cream sauce in a light pan. With less heat output per unit of time when current actually passes through the heating element, the opportunity for thermal inertia to produce overshooting in the temperature of a light load is minimized. In our system, it is possible to select a condition of less heat output per unit or "on" time regardless of what cooking temperature is desired. The second advantage is to permit more exact control of temperature of heavier loads. This is true because the heating effects are proportional to the ratio of on to off time, corresponding to the ratio of time the control switch is closed to the time it is open. By using one coil where two could well be used, the single coil will have to be energized enough more than the two to make up for the effect of the two. This means that any fixed error in timing due to the control defects and the like will be reduced because it will be a smaller part of the total time the unit is on. Hence, the temperature will be controlled more precisely.

In the system of the present invention there is provided a switch control unit which has a single setting for each temperature whether operating with one or two heating elements. In fact, the arrangement is such that every time the heating system is turned off, the units are automatically reconnected in parallel. If single coil operation is desired, it can be achieved manually after temperature selection is made by movement of a manual actuator, which is preferably a push button. It is even possible, and preferred, to combine the actuator with the control knob so that the knob itself provides the push button.

In accordance with the present invention, a heating system comprising a pair of heating elements connected in parallel is employed. A first switch element is placed in series with one of the heating elements and a second switch element is placed in series with the parallel circuit formed by these heating elements. The series circuit is adapted to be connected across a power line. An actuator means is provided for the first switch including a latch which cooperates with the first switch so that switch is normally closed in series with one heater element. Release and relatching means are provided for releasing and relatching the latch in order to permit the first switch to assume its respective open and closed conditions which correspond to different latch conditions in different embodiments. A second actuator is provided to control the second switch. The second actuator is also effective upon the latch so that when the actuator moves the second switch to "off" position, it also affects the latch in such a way that the first switch is closed.

Various specific arrangements have been devised for accomplishing these results. Two specific embodiments of the switch arrangement are shown in the accompanying drawings, in which—

FIG. 1 is a perspective view of a switch control unit of the present invention;

FIG. 2 is a plan view of the switch control unit of FIG. 1 with the cover removed and with the main cam element withdrawn therefrom;

FIG. 3 is a sectional view along line 3—3 of FIG. 2 but taken as though the switch control unit were fully assembled as in FIG. 1, and showing the latch of the present invention in latched position;

FIG. 4 is a partial view similar to FIG. 3 but showing the latch in unlatched position;

FIG. 5 is a sectional view taken along line 5—5 of FIG. 2 but as though the switch control unit were fully assembled as in FIG. 1, showing only part of the cam structure, however;

FIG. 6 is a similar sectional view taken along line 6—6 of FIG. 2;

FIG. 7 is a plan view of the rear of the switch control unit of FIG. 1 together with a schematic diagram of wiring connections to the unit;

FIG. 8 is a schematic wiring diagram of the system of the present invention including the system of FIGS. 1 to 7 in "off" condition;

FIG. 9 is a schematic wiring diagram similar to FIG. 8 but showing only the critical part of the system in "run" condition with both heater elements operating;

FIG. 10 is similar to FIG. 9 but showing one of the heater elements disconnected;

FIG. 11 is a detailed view showing the latch region in a modified form of switch control unit;

FIG. 12 is a view taken along line 12—12 of FIG. 11 showing the latch system of FIG. 11 when the unit is in "off" condition; and FIG. 13 is a view similar to FIG. 12 in which the latch actuator and the contacts of the switch in series with the second switch of the heater element are open.

Referring first to FIGS. 1 to 7, there is shown a preferred switch control unit in accordance with the present invention. The control unit of FIGS. 1 to 6 is connected in a heating system as shown in FIG. 7, the operation of which will be clear by reference to the schematic circuit diagrams of FIGS. 8, 9 and 10. Although the primary novelty of our invention lies in the control unit, it will be clear that the control unit has no utility without other circuit elements.

Referring to FIG. 1, in particular, it will be seen that the control unit is housed in large part within a box 10 molded from resinous material and provided with appendages and other formations adapted to provide advantageous support for the structure within the box as well as appropriate openings for ventilation and access purposes. Closing the top of the box is cover-plate 11 which also provides a bearing for a shaft upon which control knob 12 is mounted. Control knob 12 is provided with a calibrated dial 13 which, in operation, will be used in conjunction with a reference mark, as for example, on the range wall where it is mounted.

Within the box are provided three major single pole, single throw switches generally designated 14, 15 and 16. Switch 14 functions to remove one of a pair of parallel heating units from the circuit. Switch 15 is a series switch acting upon both heating elements which provides an on-off switch. Switch 16 is a complex switch advantageously affected by means sensing the temperature of a thermal load as it is heated to cyclically open and close in series with the heating elements to control the temperature of the thermal load. All of these switches are affected in some way by the cam member generally designated 18 which provides separate cams in the form of concentric tracks which act upon the switches in some fashion. The cam 18 is attached to knob 12 by shaft 20 to rotate with it.

As can be seen in FIGS. 2 and 3, the switch 14 is associated with a latch arrangement, generally designated 17, which determines whether the switch is open or closed. The latch is associated with cam track 19 of the rotatable cam member 18. The cam track in this embodiment of our invention actuates the latch to latched position when the cam is rotated to turn the system "off." "Off" constitutes one rotational position, and it may be only when the cam is immediately proximate to this position that track 19 is effective upon latch 17. This relatching action is effective to close the contacts of switch 14 should they be open.

As can be seen in FIG. 5, the switch 15 is actuated by another concentric cam track 21 on the cam 18. This cam track may be uniform in level except in the "off" region shown where a depression in the track permits switch 15 to open. Track 21 preferably has only one off position, the position shown, in its 360° of rotation. Thus cam 18 directly determines whether and in what positions switch 15 is open.

The switch 16, as seen in FIG. 6, is actuated by still another cam track 22 of cam 18, shown here in off position. This cam track functions to position one of the contacts of switch 16 in different positions in order to effectively change the temperature demanded.

The structures of FIGS. 1 to 6 will be better understood following a discussion of the switches in the entire system, as shown schematically in FIGS. 8–10, is first considered. In FIG. 8, the dashed enclosure 10′ corresponds to the switch control unit of FIG. 1. Within the unit are switches 14, 15 and 16 and their associated actuators. For the most part, the true physical form of the actuators is not shown, but all vital parts have been represented schematically for the sake of clarity. The complete system includes first and second heater elements 25 and 26, respectively, which may be surface pan heating coils for an electric range. A so-called "transmitter" element, within a dashed enclosure 27, is physically located in the proximity of the heating elements 25 and 26 for sensing actual heat and temperatures effects resulting from energization of these heating elements. The transmitter is coupled to switch 16 by means which may be hydraulic or mechanical as well as the electrical system shown.

FIG. 8 shows the system in "Off" or deenergized condition wherein neither of the heater elements 25 or 26 is energized. FIG. 9 shows switch 15 closed so that both heater elements are connected into the circuit. FIG. 10 shows switch 15 closed but switch 14 open so that the heater element 25 is disconnected from the circuit and deenergized. The means of accomplishing these changes will be considered later in connection with FIGS. 1 to 6.

Referring to FIGS. 7 and 8, it can be seen that the contacts of switch 14 are electrically connected in series with heater element 25 through terminal 30. Heater element 26 is connected in parallel with heater element 25 and switch 14 across terminals 31 and 32. The on-off switch 15 is connected through terminal 31 in series with the parallel circuit including both heater elements 25 and 26. Temperature selection switch 16 is connected in series with switch 15 and the parallel circuit including heater elements 25 and 26 through terminal 32. One of the contacts of switch 15 is connected to line L1 of the power line through terminal 33, and one of the contacts of switch 16 is connected through terminal 34 to line L2 of the power line. The voltage supplied across lines L1 and L2 is preferably 220 volts.

In preferred embodiments of our present invention switch 16 is a so-called "infinite switch." Switch 16 has one of its contacts 36 selectively fixed in position corresponding to the temperature desired by cam track 22 acting on a cam follower portion of the switch contact support element 37. The other switch contact 38 is preferably supported on an element including thermomotive bimetal member 39 relative to which is positioned a heating element 40 which is connected effectively to line L1 through on-off switch 15 by way of terminal 45. Heater element 40, in turn, is connected from terminal 31 through a low voltage pilot circuit to the transmitter 27. Specifically it is connected in series with a switch 41 which is cyclically opened and closed in response to a thermomotive actuator 42 which responds in part to the temperature sensed from a temperature sensing element 43 and in part to the heat from heater element 44. Heater element 44 is in series with the contacts of switch 41 and heater element 40, and is connected to low voltage line N to supply a pilot voltage, preferably of 110 volts, to this pilot circuit.

In operation the temperature of a pan will cause the bimetal to heat by thermal conduction. Additionally the bimetal of the sensor element 43 is heated by heater 44. Eventually this combined heating will cause switch 41 which is mechanically coupled to the bimetal to open and stop current flow in heater 44 as well as in heater 40. As its bimetal cools slightly, sensor 43 will permit switch 41 to close. Meantime, the cooling of heater element 40 will have caused bimetal 39 to open the contacts 36—38 of switch 16 by moving contact 38. Upon restoring the current flow through heater element 40 these contacts of switch 16 will again close. The position of contact 36 will determine how soon the switch will open and close and hence is used to pre-select temperature. Since the system takes into account the heating effect actually resulting from the operation of heating elements 25 and 26, a highly accurate control of temperature and heating results.

As can be seen in FIG. 7, the terminal connection of box 10 between heater element and switch contact 41 is terminal 45. Also connected to the neutral line end is low wattage pilot lamp 46 which in turn is connected through terminal 47 to a contact 48 which is adapted to make contact with a portion of switch 15 when the switch is closed, thereby causing lamp 46 to be lit when the system is in operation but to be extinguished when the system is not operating (i.e., when it is "off").

When the contacts 50 and 51 of switch 15 are open no current will flow through the system. When contacts 50 and 51 are closed, as in FIG. 9, provided contacts 52 and 53 of switch 16 are also closed, current flows through both heating elements 25 and 26. Contacts 52 and 53 are held closed by latch 17 when latch prop 54 engages the rotatable member 56. When the latch prop 54 is released by actuator 55, however, as shown in FIG. 10, the rotatable latch member 56 is free to rotate, and due to the natural resilience of the support 57 of switch contact 53 the switch is urged open as shown in FIG. 10 wherein contacts 52 and 53 are separated. In this condition current cannot flow through heater element 25 so that element 26 supplies all the heating. Obviously much less heat is produced per unit of time while current is flowing, but a predetermined temperature is maintained through the feedback from transmitter 27 to switch 26. This may necessitate an increase in the ratio of open to closed time for switch 16, but this will be accomplished automatically by this thermal servo system.

To obtain the advantage of the operation described in connection with the circuit shown in FIGS. 8 through 10, it is important to have an uncomplicated switch control unit capable of operation by anyone without appreciable instruction. In accordance with our present invention, the actuators for the various switches are associated with one another such that the cam which provides actuator means for switches 15 and 16 cooperates with the actuator means for switch 14 and specifically with the latch 17.

Referring again to the structure shown in FIGS. 1–7, as previously noted the integral box 10 provides ribs, bosses, shoulders, and other mounting surfaces. As seen in FIG. 5, a portion of the box is made to extend below the general level of the bottom of the box. For example, as seen in FIG. 6, the general depth of the box is extended at the end which accommodates the switch element 16. For ventilating purposes in view of heater 40, a large portion of the bottom, and even a portion of the sidewall of the box in this area, is omitted. Similarly, at the opposite end of the box a deepened and bottomless portion has been provided. The purpose of this portion is of no significance in this case and hence will not be discussed except to say that it permits terminals and other elements to be protected by location in a recessed region outside of the box.

From FIGS. 3 and 4 it can readily be seen that the shaft 20 which supports temperature selection knob 12 is adapted to pass through a bearing region in the coverplate 11 of the box. The diameter of the portion of shaft 20 within the box is reduced, and this reduced diameter portion 55 passes through the center of the box to an embossed region 61 on the bottom thereof which is bored to slidably engage the end of shaft 55 as a bearing. The reduced diameter portion 55 of the shaft also passes slidably through a central bore in cam 18. Cam 18 is provided with a cup-like recess 62 arranged coaxially with the bore through the cam 18 and into this recess a helical spring 63 is introduced around reduced diameter shaft portion 55. Spring 63 at its opposite end from that received in recess 62 bears against a spring-like spider 64 which is fixed against the shoulder 65 between the reduced diameter portion 55 and shank portion 66 of shaft 20. The center of the spider is held against the shoulder 65 so that it cannot rotate and its legs are fixed in recesses in the cam. A snap ring 67, or other suitable stop, is provided to bear against the closure plate 11 to hold the shaft assembly 20 in position within the housing against the urging of spring 63.

Cam 18, in addition to the coaxial cam tracks 19, 42 and 22, already described, is provided with a bearing track 69 against which the tops of posts 70, 71 and 72 bear (see FIG. 2) to keep the cam in a predetermined orientation and axial level within the box 10. Posts 70, 71 and 72 are preferably integrally cast in the box but may be provided with metallic bearing surface caps which make the actual contact with the cam track 69. It will be seen that the three points of contact provide stable support of he cam assembly 18 in opposition to the action of spider spring 64 and spring member 59 fixed to cover 11 to press against cam 18 in a track 60 in the top surface thereof. Spider 64 and spring 59 also add stability as well as holding the cam down against the posts.

It will be observed that despite the fixed position of cam 18 the shaft 20 itself is axially movable by pressing inwardly towards the box cover 11 on knob 12. The change of position which results from such inward pressure is shown in FIG. 4 wherein it can be seen that by pressure on shank 20 spider 64 is flattened and helical spring 63 is compressed since cam member 18 is unyieldingly held by its support posts 70, 71 and 72.

The movement of shank 20 has to do with the releasing of latch 17 which is associated with switch 14. As can be seen in FIGS. 2 and 3, fixed contact 52 of switch 14 is supported on the bottom of the switch box 10 by means of a support-conductor which connects it externally to terminal 31. Movable contact 53 of switch 14 is connected by a rivet 77 through resilient spring metal strip support 57 mechanically to a pedestal 76 formed integrally on the box bottom. Rivet 77 also connects strip 57 electrically and mechanically to terminal 30 external of the box. Thus terminal 40 is connected electrically through rivet 77 and strip 57 to contact 53. The latch structure 17, which holds the contacts 52 and 53 closed, acts upon strip 57 to accomplish this purpose. Preferably the latch consists of a generally triangular piece 56 pivotally supported by pivot 81 between walls 82 and 83 which extend upward from the bottom of the box and are integrally formed therewith. The rotatable member is provided with at least one laterally extending member 84 generally perpendicular to the plane of the rotatable member 56 and adapted to overlie the switch contact support 57. A cam follower tab 86 on rotatable member 56 is adapted to be moved by cam track 19 in a clockwise direction, as viewed in FIG. 3. This movement tends to move spring-like contact support element 57 downward to close contacts 52 and 53 in opposition to the spring effect of support 57 which normally urges the contact 53 away from contact 52. A portion of the latch projection 87 of the rotatable latch member 56 is adapted to extend through a slot in the bottom of the box when in the position of FIG. 3 but to move upwardly under the urging of resilient member 57 into the position shown in FIG. 4 when released. In moving clockwise from the position of FIG. 4 to the position of FIG. 3, the latch prop 54, if in the position of FIG. 3 due to the return of actuator shaft 20 to the position of FIG. 3, will be urged downwardly away from the bottom of the box by the cam surface 89 of projection 87. The resilience of latch prop 54 normally holds it against the bottom of the box to which it is fixed by a rivet 90. When the projection 87 reaches the point that the latch shoulder 91 passes the end of latch prop 54, the latch prop 54 will snap resiliently back into position against the bottom of the box so that its end 92 bears against shoulder 91 and holds the rotatable member 56 against counter-clockwise rotation even though the cam track 19 is changed from the "off" position of FIG. 3 to some energized position such as that shown in FIG. 4.

Referring now to FIG. 5, it will be seen that the on-off switch contacts 50 and 51 of switch 15 are controlled by cam track 21 of cam 18 through a cam follower portion 94 of spring arm 95 which is fixed to a pedestal 96 on the bottom of the box by rivet 97. Spring arm 95 mechanically supports movable contact 50 and provides an electrical current path through rivet 97 to terminal 33. Fixed contact 51 is connected by means of a common support plate 98 with fixed contact 52 of switch 14 through interconnecting rivet 99 to terminal 31. In addition, low voltage spring contact 48, which makes contact with support spring 95 of switch contact 50 when contact 50 is closed against contact 51, is supported upon the box and connected to terminal 47 which extends through an opening in the switch box and is fixed to the bottom on the inside thereof.

Finally, referring to FIG. 6 and FIG. 2, it will be seen that the cam track 22 bears against cam follower 100 on contact support assembly 37 which supports contact 36 of switch 16. This contact can be repositioned for different temperature settings but is fixed for any given setting except that the resilience of its support structure 37 permits some yielding under the pressure of contact 38 due to overclosure. The support structure 37 is connected mechanically and electrically to plate 102 which, as seen in FIGS. 2 and 3, extends laterally to a rivet 103 which, in turn, connects it to its terminal 34 (see FIG. 3). An insulator strip 104 beneath plate 102 prevents shorting of the plate against the movable support structure of switches 14 and 15 over which it passes. Contact 38 of switch 16, which opposes contact 36, is supported on a complex support structure 105 which includes heater element 40 (see FIG. 2) and bimetal 39. The construction of the switch preferably makes it a snap switch to insure rapid parting of the contacts. Support structure 105 is fixed by rivet 106 to a portion of the bottom of box 10 and at the same time to terminal 32.

In operation, the knob 12 is started from an "off" position, the condition shown in FIG. 8 and in FIG. 3 and indicated on the dial 13 which has its zero placed opposite a calibration mark on the supporting structure of the range. Knob 12 is rotated to a position wherein dial 13 indicates the desired temperature. As seen in FIG. 3 when in "off" position, the latch structure 17 is latched, holding contacts 52 and 53 closed. As the knob 12 is rotated to some temperature selection position, the latch remains latched and the contacts 52—53 closed despite removal of the portion of cam track 19 which causes relatching, if required. In this operating condition, as shown in FIG. 9, with the contacts of switch 14 closed the heating elements 25 and 26 will both be active. The switch 16 will cycle open and closed to control the effective temperature of the load by controlling the proportion of total time current may pass through the heating elements 25 and 26.

If it is desired to use a load of relatively low mass and thermal capacity, switch 14 may be opened as shown in FIG. 10 in order that heating element 25 be removed from the circuit and only heating element 26 be left active. This is accomplished by pressing the knob inwardly. This pressure causes compression of the spring 63 from the position shown in FIG. 3 to the position shown in FIG. 4 which permits the reduced diameter portion 55 of the shaft to pass through the bottom of the housing and into contact with latch prop 54. This movement urges the latch prop 54 to move below the bottom of the shoulder 91 of the rotatable latch member 80. Under the urging of spring 57 on lateral portion 84 the rotatable member 56 will move to the position shown in FIG. 4, thus moving the projection 87 out of the way of latch prop 54. To relatch the latch 17 and close the contacts of switch 14, it is necessary to return the knob 12 to the zero position. In the course of this movement cam track 19 will bear against cam follower projection 86 on the rotatable latch member 56 and cause its clockwise rotation about pivot 81. This will urge the cam surface 89 of the projection 87 against resilient latch prop 54 to displace it outwardly away from the bottom of the box until shoulder 91 on rotatable latch member 56 is passed. At this point the latch prop 54 will snap back against the bottom of box 10 and its end 92 will engage shoulder 91 and thus hold the rotatable latch member position to close the contacts of switch 14. Thereafter when the knob turns the actuator to some "on" position both heating elements will be energized.

Conceivably in some applications switch 16 might be omitted. However this would be rare because there would be no control of the temperature without switch 16. However, the switch 14 or 16 may be combined so that only two switches are employed. The three switch arrangement described is preferred to afford more flexibility in the design of switch 16.

It will be apparent to those skilled in the art that instead of using the knob as a common means of applying force to the respective actuator systems it would be possible to have separate forces-applying means. For example, it would be possible to have concentric with knob 12 a push button rigidly connected to smaller diameter portion 55 and have the larger diameter portion 66 merely a sleeve through which a shaft, the diameter of reduced diameter portion 55, passes and connects directly to the separate push button. Even more complete separation is possible by having the push button located to one side of the knob. In such a case, however, the push button would be limited in its location if linkage arrangements were not to become complicated by the fact that there must be coaction in the system of the present invention between the latch system portion of the actuator of switch 14 and the cam means which functions primarily as an actuator for switches 15 and 16.

A modified version of the present invention, and specifically the latch arrangement, is shown in FIGS. 11-13. As in the other drawings, the structure is mounted on the bottom of the box 10' at about the center thereof. The cam 18' has a cam track 19' which acts upon a rotatable portion 80' of the latch element. In this case there is a fixed contact 52' and a movable contact 53' which is supported by a modified support strip 110 which overlies the rotatable member 80' and is supported on the bottom of the box 10' by a suitable fastener means 111 which also provides a suitable electrical connection. Support strip 110 is resilient and normally urges the contact 53' downwardly against contact 52. Rotatable member 80' pivots about a fulcrum provided by the box at the junction of rotatable member 80' and a crank member 112, extending through the bottom of the box. The crank member has one of the crank arms positioned below the reduced diameter portion of shaft 55' which when moved from the position shown in FIG. 12 to the position shown in FIG. 13 causes clockwise rotation of arm 113 on crank member 112, thereby causing clockwise rotation of an elongated rotatable latch member 80' about the fulcrum at the junction between it and crank 112 adjacent one end thereof. This clockwise rotation causes member 80' to bear against member 110 raising contact 53' away from contact 52' in opposition to resilient strip 110. At the far end of rotatable member 80' is a latch element 114 which when raised sufficiently will be forced over fixed shoulder 115 formed in metallic member 116 which is affixed to and lies along one wall of the box 10'. The spring effect of member 110 will cause these members to remain in position, once latched, until released by the cam. Release occurs when the portion of cam track 19' shown in FIG. 12 again overlies the cam surface of rotatable member 80' forcing the whole structure back into the position shown in FIG. 12. FIG. 12 thus represents the "off" position of the switch corresponding to switch 15. As the dial is set at a particular temperature range, the cam track 19' no longer prevents rotation of the rotatable latch member 80'. This normal operating condition for both heating elements can be easily visualized and has therefore not been illustrated. Thus when actuator 55' is pressed downwardly, as shown in FIG. 13, against the lever arm 113, the rotatable member 80' rotates and the latching action takes place. Latching, in this instance, opens rather than closes the switch contacts 52—53 and holds them open until closed once again by action of cam track 19' on cam rotatable latch member 80'.

The embodiments of the invention shown have not been limited in any way as to application and the type of transmitter or feedback element illustrated in FIG. 8 should not be taken to imply that the systems described are limted to use with surface units for electric ranges. Our invention may, in fact, be employed with wattage controllers of all types and for all purposes in which an adjustable heat capacity may be desirable. In addition to being useful on the top of the range, the heating elements 25 and 26 may be used within an oven, for example.

When used with a heating unit for the top of an electric range, it may be desirable in some instances to make the switch 14 normally open instead of normally closed.

This would have the effect of initiating heating of only one of the heater elements which may be the smaller element and would be in line with the usual practice of providing a single smaller element for smaller pans and giving the larger capacity of the whole surface unit for larger pans. If this were done, actuation of the push-button might serve to close the switch and energize both units. In any event, the present invention is intended to be of sufficient scope to cover the various possible combinations of either initially open or closed switches with latches initially either latched or unlatched.

Several embodiments of the present invention have been shown and modifications have been suggested. Other modifications will occur to those skilled in the art. All such modifications within the scope of the claims are intended to be within the scope and spirit of the present invention.

We claim:

1. A heating system comprising a pair of heating elements connected in parallel to provide a parallel circuit, a first switch having a pair of switch contacts movable between open and closed conditions in series with one of the heating elements within the parallel circuit whereby said element may be selectively connected to or disconnected from the circuit, a second switch connected in a series circuit with the parallel circuit, said series circuit being adapted to be connected across a power line, an actuator system for the first switch including a latch coupled to the first switch to constrain the switch contacts to one condition when latched, resilient means continuously urging said switch contacts to the other condition against the constraint of said latch, first manually operable means for latching said contacts in one condition, second manually operable means for releasing the latch whereby said resilient means can move the contacts to the other condition, said manually operable means being the sole means for changing the condition of said switch contacts, and an actuator for the second switch enabling its positioning between open and closed position, said actuator comprising one of said manually operable means effective when the actuator is positioned in open switch position.

2. The heating system of claim 1 in which the second switch is associated with sensing means for sensing the temperature of a thermal load proximate to the heater elements and is capable of selecting different heating effects on the thermal load, and the actuator for the second switch includes a cam means acting upon the second switch to selectively position it in various positions corresponding to different heating effects, including off, said cam also having a region associated with the latch of the actuating means for the first switch, at least in the open contact position of the second switch, which acts upon the latch in such a way that the contacts of the first switch are closed whenever the actuator for the second switch moves the second switch to off position corresponding to open switch position.

3. The heating system of claim 2 in which the first and second switches and their associated actuating means are located relative to one another within a confined region and in which the actuator means for the first switch includes push-button means to selectively manually move the latch of the actuator for the first switch to change the switch condition.

4. The heating system of claim 3 in which the cam means in the actuator for the second switch is a rotatable element attached to a rotatable knob for adjustment of the second switch through a cam follower and the push-button system includes a force transmitting linkage element coupled to the latch and extending coaxially of the cam.

5. The heating system of claim 4 in which the knob which provides rotation to the actuator for the first switch serves also as the push-button of the actuator for the second switch.

6. The heating system of claim 1 in which the second switch is an on-off switch and a third switch in series with the second switch and the parallel circuit is provided for regulating the energy output of the heating elements and in which a common cam serves as part of the actuator system for both the second and third switches.

7. A heating system comprising a pair of heater elements connected in parallel to provide a parallel circuit, a first switch having a pair of switch contacts movable between open and closed conditions in series with one of the heating elements within the parallel circuit whereby said element may be selectively removed from the circuit, a second switch connected in a series circuit with the parallel circuit, said series circuit being adapted to be connected across a power line, an actuator system for the second switch enabling its positioning between opened and closed switch positions, an actuator system for the first switch including a latch coupled to the first switch to constrain the switch contacts in closed condition when latched, resilient means continuously acting upon the first switch to urge its contacts toward open condition against the constraint of said latch, manually operable release means for freeing the latch from its latched condition to permit the contacts of the first switch to open, and restoring means for returning the latch to latched condition to close the contacts of the first switch, said restoring means including means associated with the actuator for the second switch and effective upon positioning in open position for the second switch to relatch the latch, said release and restoring means being the sole means for changing the condition of said switch contacts.

8. The heating system of claim 7 in which the second switch is associated with sensing means for sensing the temperature of a thermal load proximate to the heater elements and is capable of selecting different heating effects on the thermal load and in which the actuator for the second switch includes a cam effective upon the second switch to selectively position it in various positions corresponding to different heating effects, including off.

9. The heating system of claim 8 in which the latch means consists of a rotatable latch element having a latch shoulder and a latch prop positioned to abut the shoulder and hold the latch in latched condition against the resilient means urging the first switch contacts open and in which the release means for freeing the latch from its latched condition includes a push-button element coupled to the latch prop whereby pressure on the push-button will move the latch prop to release the rotatable latch element to rotate under the urging of the resilient means.

10. The heating system of claim 9 in which the cam actuation means for the second switch includes means cooperable with the rotatable latch element at least in the region of open contact position of the second switch to urge the rotatable latch member into a position where relatching will occur.

11. The heating system of claim 9 in which the push-button actuator includes a rod aligned with the button and movable against the latch prop and resilient means urging the rod out of contact with the latch prop which assembly is located coaxially of a knob for rotating the cam of the actuator for the second switch.

12. The structure of claim 11 in which the knob provided for rotation of the cam means serves also as the push-button and the rod of the push button system serves to support the cam.

13. A heating system comprising a pair of heating elements connected in parallel to provide a parallel circuit, a first switch having a pair of switch contacts movable between open and closed conditions in series with one of the heating elements within the parallel circuit whereby said element may be selectively removed from the circuit, a second switch connected in a series circuit with the parallel circuit, said series circuit being adapted to be connected across a power line, an actuator system for the second switch enabling its positioning between open and closed switch positions, an actuator system for the first switch including a latch coupled to the first switch to constrain the switch contacts to open condition when latched, resilient means continuously urging the first switch contacts to the closed condition against the constraint of said latch, manually operable release means for freeing the latch from its latched condition to permit its contacts to close and restoring means for returning the latch to latched condition to open its contacts, said release means including means associated with the actuator for the second switch and effective upon positioning in open position for the second switch to release the latch, said release and restoring means being the sole means for changing the condition of said switch contacts.

14. The heating system of claim 13 in which the second switch is associated with sensing means for sensing the temperature of a thermal load proximate to the heater elements and is capable of selecting different heating effects on the thermal load and in which the actuator for the second switch includes a cam upon the second switch to selectively position it in various positions corresponding to different heating effects, including off.

15. The heating system of claim 14 in which the latch means consists of a rotatable latch element and a fixed shoulder over which a part of the rotatable latch element is free to move to hold the latch in latched condition against the resilient means urging the first switch contacts open and in which the restoring means for relatching the latch includes a push-button element coupled to the rotatable latch element whereby pressure on the push-button will move the rotatable element to latched position against the urging of the resilient means.

16. The heating system of claim 15 in which the cam actuator for the second switch includes at least part of the release means for the latch element cooperable with the rotatable latch element at least in the region of open contact position of the second switch to urge the rotatable member away from the fixed shoulder.

17. The heating system of claim 16 in which the push-button actuator includes a rod aligned with the button and movable against part of the rotatable element and resilient means urging the rod out of contact with the rotatable element which assembly is located coaxially of a knob for rotating the cam of the actuator for the second switch.

18. The structure of claim 17 in which the knob provided for rotation of the cam means serves also as the push button and the rod of the push button system serves to support the cam.

References Cited in the file of this patent

UNITED STATES PATENTS

| | | |
|---|---|---|
| 2,388,702 | Pearce | Nov. 13, 1945 |
| 2,435,530 | Candor | Feb. 3, 1948 |
| 2,648,755 | Vogelsberg | Aug. 11, 1953 |
| 2,666,124 | Vogelsberg | Jan. 12, 1954 |
| 2,675,455 | Richardson | Apr. 13, 1954 |
| 2,685,636 | Vogelsberg | Aug. 3, 1954 |
| 2,779,827 | Brown et al. | Jan. 29, 1957 |
| 2,781,425 | Glowzinski et al. | Feb. 12, 1957 |